(12) United States Patent
Vishwakarma et al.

(10) Patent No.: US 11,663,290 B2
(45) Date of Patent: May 30, 2023

(54) ANALYZING TIME SERIES DATA FOR SETS OF DEVICES USING MACHINE LEARNING TECHNIQUES

(71) Applicant: EMC IP Holding Company LLC, Hopkinton, MA (US)

(72) Inventors: Rahul Vishwakarma, Bangalore (IN); Shelesh Chopra, Bangalore (IN); Gopal Singh, Lucknow (IN); Sujan Kumar Shetty, Karnataka (IN)

(73) Assignee: EMC IP Holding Company LLC, Hopkinton, MA (US)

(*) Notice: Subject to any disclaimer, the term of this patent is extended or adjusted under 35 U.S.C. 154(b) by 651 days.

(21) Appl. No.: 16/778,456

(22) Filed: Jan. 31, 2020

(65) Prior Publication Data

US 2021/0241929 A1 Aug. 5, 2021

(51) Int. Cl.
| | | |
|---|---|---|
| *G06F 17/17* | (2006.01) | |
| *G16Y 40/35* | (2020.01) | |
| *G06N 20/00* | (2019.01) | |
| *H04W 84/18* | (2009.01) | |
| *G06F 17/11* | (2006.01) | |
| *G16Y 40/20* | (2020.01) | |
| *G06F 17/16* | (2006.01) | |
| *G06F 17/18* | (2006.01) | |

(52) U.S. Cl.
CPC ............. *G06F 17/17* (2013.01); *G06F 17/11* (2013.01); *G06F 17/16* (2013.01); *G06F 17/18* (2013.01); *G06N 20/00* (2019.01); *G16Y 40/20* (2020.01); *G16Y 40/35* (2020.01); *H04W 84/18* (2013.01)

(58) Field of Classification Search
CPC .......... G06F 17/17; G06F 17/11; G06F 17/16; G06F 17/18; G06N 20/00; G16Y 40/35; G16Y 40/20; H04W 84/18
See application file for complete search history.

(56) References Cited

U.S. PATENT DOCUMENTS

| | | | |
|---|---|---|---|
| 10,108,907 B2 | 10/2018 | Bugay et al. | |
| 10,379,502 B2 | 8/2019 | Sharma et al. | |
| 11,295,217 B2* | 4/2022 | Herzog | G06N 5/045 |
| 2018/0059656 A1 | 3/2018 | Hiruta et al. | |
| 2019/0280942 A1* | 9/2019 | Côté | H04L 41/40 |
| 2021/0042297 A1* | 2/2021 | Urbanke | G06N 20/00 |
| 2021/0124492 A1* | 4/2021 | Savir | G06F 3/0631 |

* cited by examiner

*Primary Examiner* — Elias Desta
(74) *Attorney, Agent, or Firm* — Ryan, Mason & Lewis, LLP

(57) ABSTRACT

Methods, apparatus, and processor-readable storage media for analyzing time series data for sets of devices using machine learning techniques are provided herein. An example computer-implemented method includes processing time series data from multiple devices; generating at least one data forecast by applying, in response to a request from at least one user, one or more machine learning techniques to at least a portion of the processed time series data; computing one or more qualifying values attributable to the at least one generated data forecast by providing the at least one generated data forecast and the at least a portion of the processed time series data to a conformal prediction framework; and performing one or more automated actions based at least in part on the at least one generated data forecast and the one or more computed qualifying values.

20 Claims, 6 Drawing Sheets

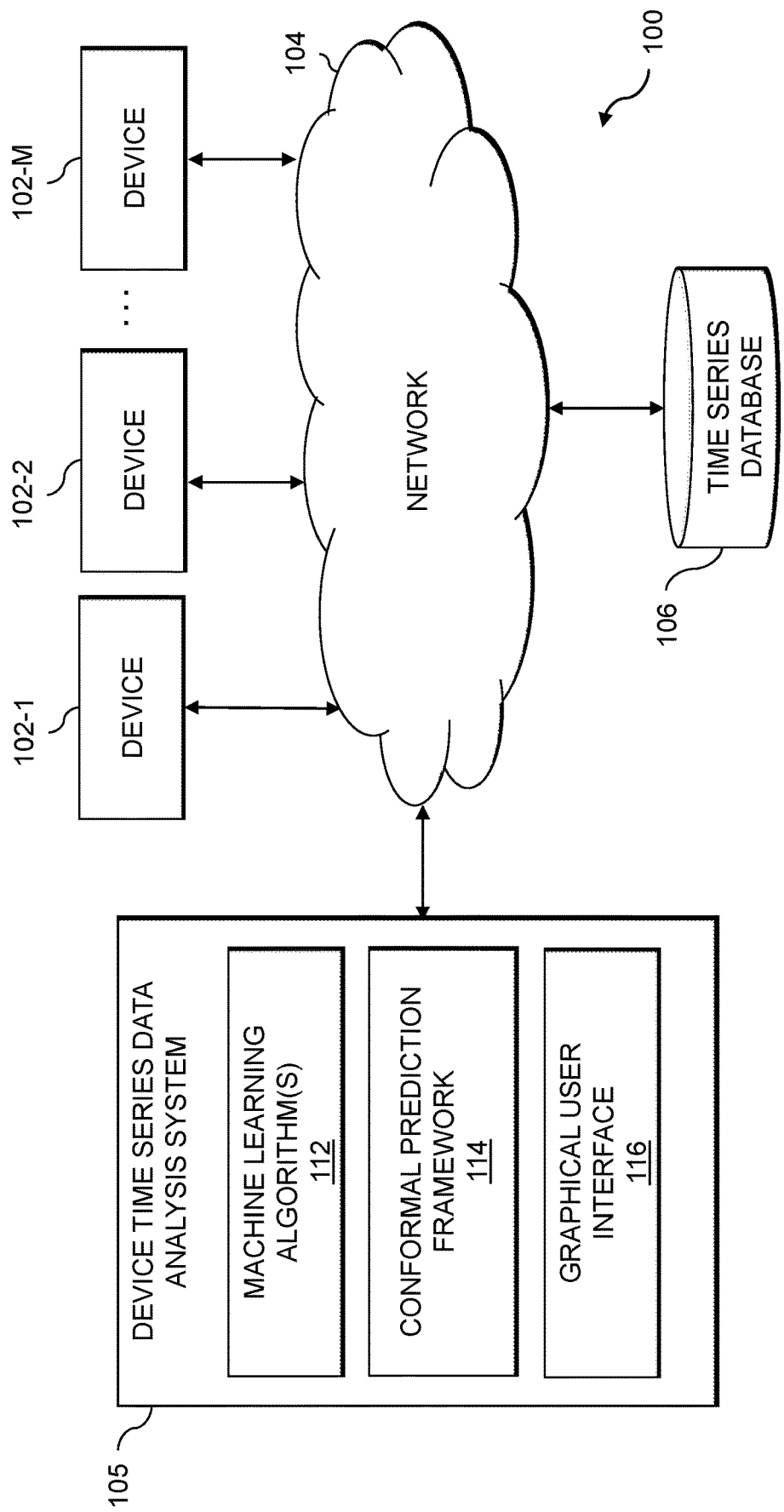

Let X be the data matrix, y be the label, σ be the standard deviation of Gaussian Noise, ρ, γ be tuning parameters, and k be the number of segments.

function GreedySegmented($\rho, \gamma, \sigma, X, y$)
Initial partition of [n] points in interval of length 1
$I^0 \leftarrow \{\{1\}, \{2\}, \ldots, \{n\}\}$
Iterative GreedySegmented (start with $j \leftarrow 0$)
while $|I^j| > \left(2 + \frac{1}{\rho}\right)k + \gamma$ do
    Let $\sigma_j$ be the current number of intervals
    Calculate the least squares fit and corresponding error for merging neighboring pairs of intervals.
    Let LeastSquares$(X, y, I)$ represent an algorithm which returns the coefficients of the linear least squares fit for the data points in $I$.
    for $u \in \left\{1, 2, \ldots, \frac{\sigma_j}{2}\right\}$ do
        $\Psi = I_{2u-1} \cup I_{2u}$
        $\Phi_u \leftarrow LeastSquares(X, y, \Psi)$
        $e_u = \|y_I - X_I \Phi_u\|_2^2 - \sigma^2|\Psi|$
    end for

Let P be the set of indices $u$ with the $\left(1 + \frac{1}{\rho}\right)k$ largest error $e_u$, arbitrarily break in case of ties
    Let Q be the set of remaining indices
    Keep the interval that has larger merge error
    $I^{j+1} \leftarrow \bigcup_{u \in P} (\Psi)$
    Merge the remaining interval
    $I^{j+1} \leftarrow I^{j+1} \bigcup \{\Psi_I | u \in Q\}$
    $j \leftarrow j + 1$
end while
return the least squares fit of data in the interval in $I^j$
end function

Input: Parameters $\varepsilon$ and $y_1, y_2$
$y_2' := y_2$
$\alpha_2(y) := 0$
for n = 3, 4, 5, ... do
  $y_n' := y_2$
  $y_n' := GreedySegmented(\rho, \gamma, \sigma, X, y) \to y_n$
  $p := \max \{r \in \mathbb{R} : \dfrac{\#(\alpha_i \geq r, 2 \leq i \leq n-1)}{n-2} \geq \varepsilon\}$
  Output $\Gamma_n := [y_n' - p, y_n' + p]$ as prediction for $y_n$
  Get $y_n$
  $\alpha_n(y) := |y_n - y_n'|$
end for

FIG. 3

ANALYZING TIME SERIES DATA FOR SETS OF DEVICES USING MACHINE LEARNING TECHNIQUES

FIELD

The field relates generally to information processing systems, and more particularly to techniques for data analysis using such systems.

BACKGROUND

The proliferation of devices such as Internet of Things (IoT) devices, sensor networks, and other telemetry devices has resulted in vast amounts of time series data, which can be used in forecasting for a variety of use cases. However, conventional data analysis techniques pertaining to time series data-based forecasting commonly involve labor-intensive manual processes specified for the analysis of a single data series of a limited number of data points. Additionally, such conventional data analysis techniques typically lack quantifications of confidence and/or credibility values attributed to time series data-based forecasts.

SUMMARY

Illustrative embodiments of the disclosure provide techniques for analyzing time series data for sets of devices using machine learning techniques. An exemplary computer-implemented method includes processing time series data from multiple devices, and generating at least one data forecast by applying, in response to a request from at least one user, one or more machine learning techniques to at least a portion of the processed time series data. The method also includes computing one or more qualifying values attributable to the at least one generated data forecast by providing the at least one generated data forecast and the at least a portion of the processed time series data to a conformal prediction framework. Further, the method additionally includes performing one or more automated actions based at least in part on the at least one generated data forecast and the one or more computed qualifying values.

Illustrative embodiments can provide significant advantages relative to conventional data analysis techniques pertaining to time series data-based forecasting. For example, problems associated with manual processes specified for the analysis of a single data series of a limited number of data points are overcome in one or more embodiments through utilization of segmented regression techniques integrated with a greedy algorithm for providing automated time series data-based forecasting, supplemented by a conformal prediction framework to generate confidence and credibility values associated with each forecast.

These and other illustrative embodiments described herein include, without limitation, methods, apparatus, systems, and computer program products comprising processor-readable storage media.

BRIEF DESCRIPTION OF THE DRAWINGS

FIG. 1 shows an information processing system configured for analyzing time series data for sets of devices using machine learning techniques in an illustrative embodiment.

FIG. 2 shows example pseudocode for a machine learning segmented regression algorithm using greedy merging techniques in an illustrative embodiment.

FIG. 3 shows example pseudocode for a conformal framework for time series data in an illustrative embodiment.

DETAILED DESCRIPTION

Figure 4:
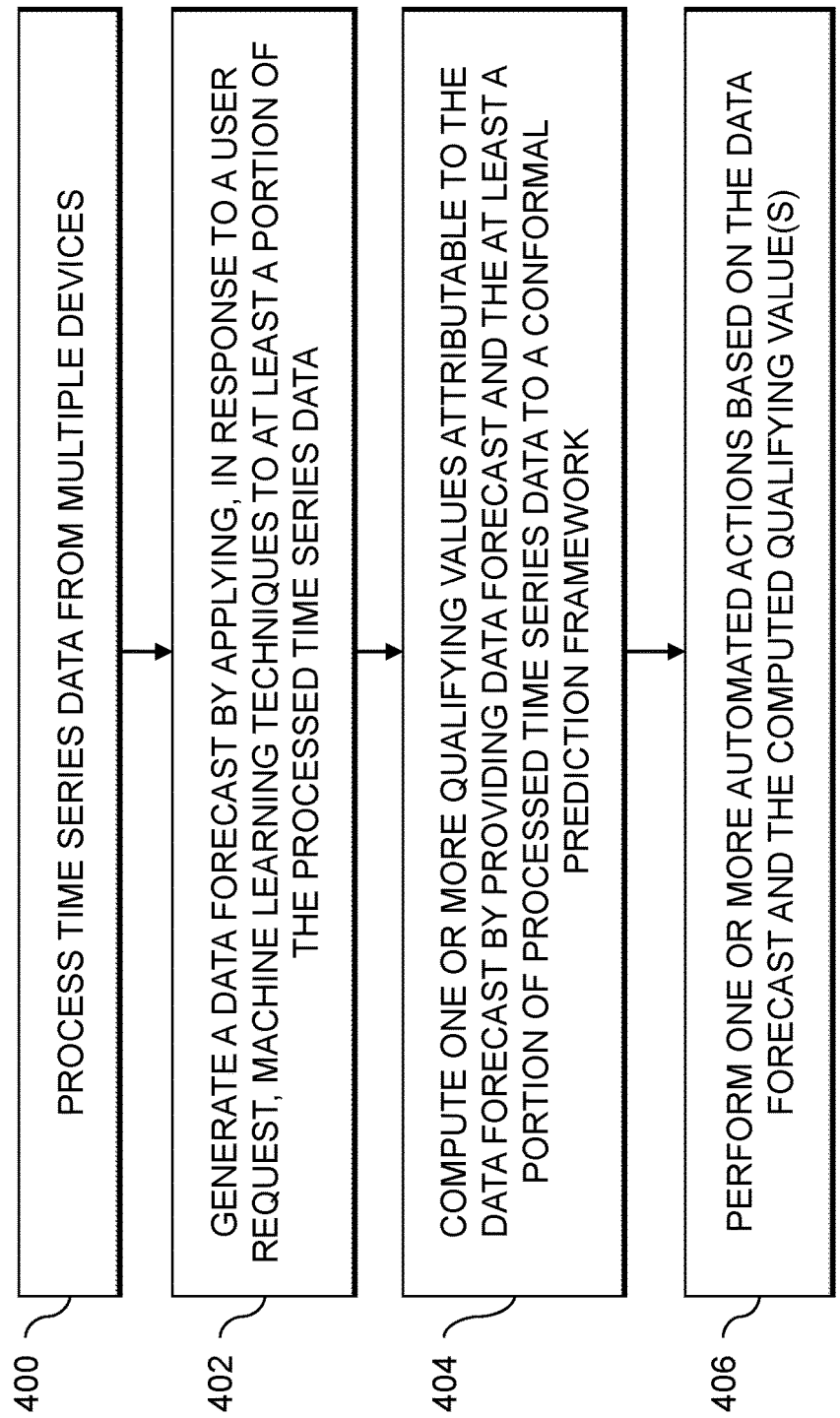
FIG. 4 is a flow diagram of a process for analyzing time series data for sets of devices using machine learning techniques in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

FIG. 1 shows a computer network (also referred to herein as an information processing system) 100 configured in accordance with an illustrative embodiment. The computer network 100 comprises a plurality of devices 102-1, 102-2, . . . 102-M, collectively referred to herein as devices 102. The devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is device time series data analysis system 105.

The devices 102 may comprise, for example, IoT devices, mobile telephones, laptop computers, tablet computers, desktop computers or other types of computing devices. Such devices are examples of what are more generally referred to herein as "processing devices." Some of these processing devices are also generally referred to herein as "computers."

The devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the device time series data analysis system 105 can have an associated time series database 106 configured to store historical time series data pertaining to devices 102 as well as generated forecasts derived from and/or related to device time series data.

The database 106 in the present embodiment is implemented using one or more storage systems associated with device time series data analysis system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with device time series data analysis system 105 can be input-output devices, which illustratively comprise keyboards, displays or other types of input-output devices in any combination. Such input-output devices can be used, for example, to support one or more user interfaces to system 105, as well as to support communication between system 105 and other related systems and devices not explicitly shown.

The device time series data analysis system 105 in the FIG. 1 embodiment is assumed to be implemented using at least one processing device. Each such processing device generally comprises at least one processor and an associated memory, and implements one or more functional modules for controlling certain features of the 105.

More particularly, device time series data analysis system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows device time series data analysis system 105 to communicate over the network 104 with the devices 102, and illustratively comprises one or more conventional transceivers.

The device time series data analysis system 105 further comprises one or more machine learning algorithms 112, a conformal prediction framework 114, and a graphical user interface (GUI) 116.

It is to be appreciated that this particular arrangement of modules 112, 114, and 116 illustrated in the device time series data analysis system 105 of the FIG. 1 embodiment is presented by way of example only, and alternative arrangements can be used in other embodiments. For example, the functionality associated with the modules 112, 114, and 116 in other embodiments can be combined into a single module, or separated across a larger number of modules. As another example, multiple distinct processors can be used to implement different ones of the modules 112, 114, and 116 or portions thereof.

At least portions of modules 112, 114, and 116 may be implemented at least in part in the form of software that is stored in memory and executed by a processor.

It is to be understood that the particular set of elements shown in FIG. 1 for analyzing time series data for sets of devices using machine learning techniques involving devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114, and 116 of an example device time series data analysis system 105 in computer network 100 will be described in more detail with reference to the flow diagram of FIG. 4.

Accordingly, at least one embodiment includes analyzing time series data for sets of devices using machine learning techniques. By way of illustration, descriptions of one or more embodiments herein involve an example use case pertaining to a storage capacity forecasting implementation. However, it should be appreciated that one or more embodiments can be implemented in connection with a variety of devices (e.g., storage devices, IoT devices, etc.). Additionally, at least one embodiment includes utilizing a variety of database types, such as, for example, purpose-built databases (e.g., InfluxDB) that are specifically built for time series data.

As detailed herein, one or more embodiments include computing confidence and credibility values attributed to generated predictions. Such computations are carried out via implementation of a conformal prediction framework, which is used in conjunction with a prediction algorithm to provide the probability distribution of each such prediction.

By way of illustration, consider the following example use case, which forecasts the growth trend in a storage array. Such an example embodiment includes obtaining time series data from the given storage array, wherein the data include time stamps and pre-compressed data at the given instances of time, and the retrieved data are then stored in a purpose-built time series database. Assume that a user requests a desired action such as, for example, wishing to visualize capacity forecasting information. In response to this request, the example embodiment includes fetching at least a portion of the time series data from the database and applying a segmented regression integrated with a greedy algorithm to the fetched data to generate the forecast. Additionally, the example embodiment includes processing the generated forecast in conjunction with the fetched data using a conformal prediction framework to generate a confidence value and a credibility value attributed to the forecast. The generated forecast and the confidence and credibility values are then output to the user via a visualization using at least one interface.

As further detailed herein, a conformal prediction framework utilized in one or more embodiments outputs multi-value prediction regions. For example, given a test pattern $X_i$ and a significance level $\epsilon$, a conformal prediction framework outputs a prediction region $\Gamma \epsilon / i$ that contains $y_i$ with probability $1-\epsilon$. Such multi-value prediction regions can include confidence and credibility values. As used herein, such confidence values refer to measures indicative of the quality of the generated forecast and/or prediction. Also, as used herein, credibility values refer to measures indicative of the quality of the data on which the generated forecast and/or prediction was based. In one or more embodiments, a credibility value can be utilized as a filter mechanism with which certain forecasts and/or predictions can be rejected and/or ignored.

FIG. 2 shows example pseudocode 200 for a machine learning segmented regression algorithm using greedy merging techniques in an illustrative embodiment. In this embodiment, pseudocode 200 is executed by or under the control of a processing device, such as device time series data analysis system 105, or another type of processing device.

The pseudocode 200 illustrates implementing a segmented regression integrated with a greedy algorithm, which includes initiating partitioning points in intervals of a given length and iterating the algorithm, which includes calculating the least squares fit and the corresponding error for merging neighboring pairs of intervals. The interval that has the largest merge error is maintained (and the remaining intervals are merged), and the least squares fit of data in the corresponding interval is output.

It is to be appreciated that this particular pseudocode shows just one example implementation of a machine learning segmented regression algorithm using greedy merging techniques, and alternative implementations of other algorithms can be used in other embodiments.

FIG. 3 shows example pseudocode 300 for a conformal framework for time series data in an illustrative embodiment. In this embodiment, pseudocode 300 is executed by or under the control of a processing device, such as device time series data analysis system 105, or another type of processing device.

The pseudocode 300 illustrates implementing a conformal prediction framework to generate values for confidence and credibility parameters associated with a prediction generated by a segmented regression integrated with a greedy algorithm.

It is to be appreciated that this particular pseudocode shows just one example implementation of a conformal framework for time series data, and alternative implementations of other frameworks can be used in other embodiments.

Referring to the conformal prediction framework, consider an illustrative use case wherein X represents a measurable space (e.g., the object space) and Y represents a finite set (e.g., the label space). Assume that every sample, $z_i=(x_i, y_i)$, is composed of an object $x_i \in X$ and a label $y_i \in Y$. The observation space is then defined as $Z:=X*Y$, and $z_i \in Z$. One or more embodiments can include finding a measurable function A that changes every sequence of observations, $(z_1, z_2, \ldots, z_n) \in Z$, to a same-length sequence $(\alpha_1, \ldots, \alpha_n) \in R$, which is formed by positive real numbers and is equivariant with respect to permutations for any permutation $\pi$ of $\{1, \ldots, n\}$, as follows: $(\alpha_1, \ldots, \alpha_n) = A(z_1, \ldots, z_n) \to (\alpha_{\pi(1)}, \ldots, \alpha_{\pi(n)}) = A(z_{\pi(1)}, \ldots, z_{\pi(n)})$.

The conformal predictor determined by A meets the exchangeability assumption and is defined by $\Gamma^\epsilon(z_1, \ldots, z_l, x) := \{y | p^y > \epsilon\}$, wherein $(z_1, \ldots, z_l) \in Z$ is a training sequence that is a part of observation space $(z_1, z_2, \ldots, z_n)$, x is a test object, and $y \in Y$ are potential labels for x. Additionally, Y is the set of labels for all sample categories, and $\Gamma^\epsilon$ is a corresponding prediction region with a given significance level $\epsilon \in (0,1)$. For each $y \in Y$, the corresponding value is defined by the following:

$$p^y = \frac{|\{i = 1, \ldots, l+1 | \alpha_i^y \geq \alpha_{l+1}^y\}|}{l+1}$$

The corresponding sequence of nonconformity scores is defined by $$(\alpha_1^y, \ldots, \alpha_l^y, \alpha_{l+1}^y) = A(z_1, \ldots, z_l, (x,y))$$

Generally, the lower the $\alpha_{l+1}^y$, the greater the level of confidence, and the lower the $p^y$, the less that the prediction and/or forecast can be trusted. Also, in one or more embodiments, the prediction regions in a conformal predictor are nested, i.e., for any $(\epsilon_1 < \epsilon_2)$, $$\Gamma^{\epsilon_2}(z_1, \ldots, z_l, x) \subseteq \Gamma^{\epsilon_1}(z_1, \ldots, z_l, x)$$

The property of validity of a conformal predictor is that for any l, the probability of the event $(y_{l+1} \in \Gamma^\epsilon(z_1, \ldots, z_l, x_{l+1}))$ is at least $(1-\epsilon,)$; that is, $P(y_{l+1} \notin \Gamma^\epsilon(z_1, \ldots, z_l, x_{l+1})) \leq \epsilon$.

In connection with at least one embodiment, one or more prediction algorithms can be modified and/or utilized as underlying algorithms for a nonconformity measure. In an example embodiment, a nonconformity measure is generated based on a k-nearest neighbor (KNN) algorithm. Given a sequence of examples $(z_1, \ldots, z_n)$, the nonconformity score measured by conformal predictor-KNN is $$\alpha_i := \frac{\sum_{j=1}^{k} d_{ij}^+}{\sum_{j=1}^{k} d_{ij}^-} i = 1, \ldots, n$$

with the example $z_i=(x_i, y_i)$, wherein $d_{ij}^+$ is the $j^{th}$ shortest distance from $x_i$ to other objects labelled the same as $x_i$, and $d_{ij}^-$ is the $j^{th}$ shortest distance from $x_i$ to other objects labelled differently from $x_i$. The parameter k is the number of elements taken into account. The larger $\alpha_i$ is, the stranger and/or more unpredictable $z_i$ is, and $z_i$ is shown to be more non-conformal than other elements.

As also detailed herein, two indicators, confidence and credibility, are used to provide additional information about the prediction. In one or more embodiments, those indicators are defined as:

confidence: $\sup\{1-\epsilon : |\Gamma^\epsilon| \leq 1\}$ credibility: $\inf\{\epsilon : (|\Gamma^\epsilon|=0)\}$ In the classification case, confidence equals one minus the second maximum p-value, which shows the level of confidence in rejecting other labels. Credibility equals the highest p-value, which shows how well the chosen label conforms to the rest of the set. In at least one example embodiment, the forced prediction is considered to be reliable if its confidence is close to one and credibility is not close to zero.

FIG. 4 is a flow diagram of a process for analyzing time series data for sets of devices using machine learning techniques in an illustrative embodiment. It is to be understood that this particular process is only an example, and additional or alternative processes can be carried out in other embodiments.

In this embodiment, the process includes steps 400 through 406. These steps are assumed to be performed by the device time series data analysis system 105 utilizing its modules 112, 114 and 116.

Step 400 includes processing time series data from multiple devices. Processing the time series data can include reformatting at least a portion of the time series data from the multiple devices. Also, in at least one embodiment, the multiple devices can include one or more IoT devices and/or one or more storage devices.

Step 402 includes generating at least one data forecast by applying, in response to a request from at least one user, one or more machine learning techniques to at least a portion of the processed time series data. In at least one embodiment, the one or more machine learning techniques include at least one segmented regression technique. Additionally or alternatively, the one or more machine learning techniques can include at least one segmented regression technique integrated with a greedy algorithm. Further, in one or more embodiments, the at least one data forecast can pertain to anomaly detection and/or capacity utilization.

Step 404 includes computing one or more qualifying values attributable to the at least one generated data forecast by providing the at least one generated data forecast and the at least a portion of processed time series data to a conformal prediction framework. The one or more qualifying values can include at least one confidence value attributed to the at least one generated data forecast and/or at least one credibility value indicating quality of the at least a portion of processed time series data used in generating the at least one data forecast.

Step 406 includes performing one or more automated actions based at least in part on the at least one generated data forecast and the one or more computed qualifying values. In at least one embodiment, performing the one or more automated actions includes outputting a visualization of the at least one generated data forecast and the one or more computed qualifying values via a graphical user interface.

The techniques depicted in FIG. 4 can also include storing the processed time series data in at least one time series database which stores information pertaining to multiple variables derived from the processed time series data.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to provide automated time series data-based forecasting using segmented regression techniques integrated with a greedy algorithm in conjunction with a conformal prediction framework. These and other embodiments can effectively avoid problems associated with manual processes specified for the analysis of a single data series of a limited number of data points.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
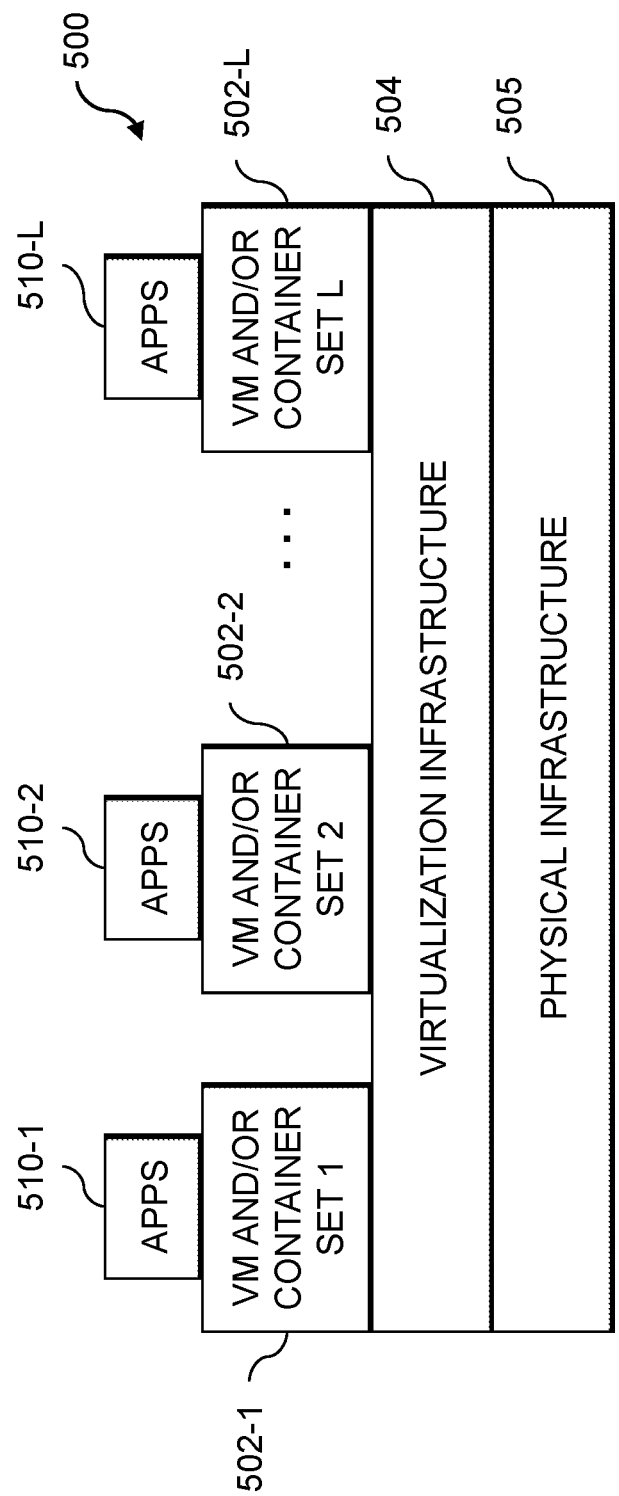
FIGS. 5 and 6 show examples of processing platforms that may be utilized to implement at least a portion of an information processing system in illustrative embodiments.
Figure 6:
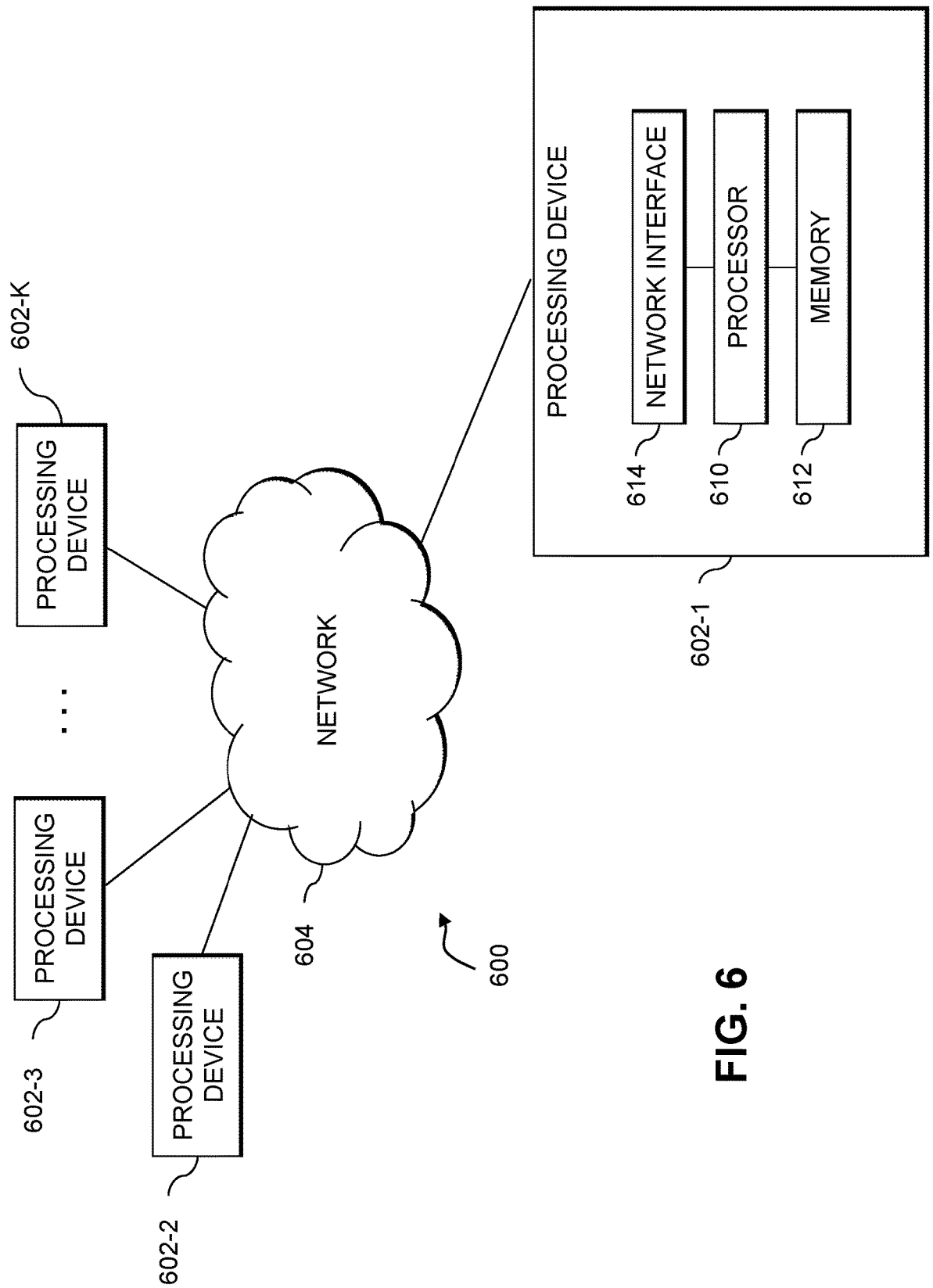

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
processing time series data from multiple devices, wherein the multiple devices comprise one or more Internet of Things devices;
generating at least one data forecast by applying, in response to a request from at least one user, one or more machine learning techniques to at least a portion of the processed time series data;
computing one or more qualifying values attributable to the at least one generated data forecast by providing the at least one generated data forecast and the at least a portion of the processed time series data to a conformal prediction framework; and
performing one or more automated actions based at least in part on the at least one generated data forecast and the one or more computed qualifying values, wherein performing the one or more automated actions comprises outputting, in response to at least one user request for data forecast information submitted via at least one interactive graphical user interface, at least one visualization of at least a portion of the at least one generated data forecast and at least a portion of the one or more computed qualifying values via the at least one interactive graphical user interface;
wherein the method is performed by at least one processing device comprising a processor coupled to a memory.

2. The computer-implemented method of claim 1, wherein the one or more machine learning techniques comprise at least one segmented regression technique.

3. The computer-implemented method of claim 1, wherein the one or more machine learning techniques comprise at least one segmented regression technique integrated with a greedy algorithm.

4. The computer-implemented method of claim 1, wherein the one or more qualifying values comprise at least one confidence value attributed to the at least one generated data forecast.

5. The computer-implemented method of claim 1, wherein the one or more qualifying values comprise at least one credibility value indicating quality of the at least a portion of the processed time series data used in generating the at least one data forecast.

6. The computer-implemented method of claim 1, wherein processing the time series data comprises reformatting at least a portion of the time series data from the multiple devices.

7. The computer-implemented method of claim 1, further comprising:
storing the processed time series data in at least one time series database which stores information pertaining to multiple variables derived from the processed time series data.

8. The computer-implemented method of claim 1, wherein the multiple devices comprise one or more storage devices.

9. The computer-implemented method of claim 1, wherein the at least one data forecast pertains to anomaly detection.

10. The computer-implemented method of claim 1, wherein the at least one data forecast pertains to capacity utilization.

11. A non-transitory processor-readable storage medium having stored therein program code of one or more software programs, wherein the program code when executed by at least one processing device causes the at least one processing device:
to process time series data from multiple devices, wherein the multiple devices comprise one or more Internet of Things devices;
to generate at least one data forecast by applying, in response to a request from at least one user, one or more machine learning techniques to at least a portion of the processed time series data;
to compute one or more qualifying values attributable to the at least one generated data forecast by providing the at least one generated data forecast and the at least a portion of the processed time series data to a conformal prediction framework; and
to perform one or more automated actions based at least in part on the at least one generated data forecast and the one or more computed qualifying values, wherein performing the one or more automated actions comprises outputting, in response to at least one user request for data forecast information submitted via at least one interactive graphical user interface, at least one visualization of at least a portion of the at least one generated data forecast and at least a portion of the one or more computed qualifying values via the at least one interactive graphical user interface.

12. The non-transitory processor-readable storage medium of claim 11, wherein the one or more machine learning techniques comprise at least one segmented regression technique integrated with a greedy algorithm.

13. The non-transitory processor-readable storage medium of claim 11, wherein the one or more qualifying values comprise at least one confidence value attributed to the at least one generated data forecast.

14. The non-transitory processor-readable storage medium of claim 11, wherein the one or more qualifying values comprise at least one credibility value indicating quality of the at least a portion of the processed time series data used in generating the at least one data forecast.

15. An apparatus comprising:
at least one processing device comprising a processor coupled to a memory;
the at least one processing device being configured:
to process time series data from multiple devices, wherein the multiple devices comprise one or more Internet of Things devices;
to generate at least one data forecast by applying, in response to a request from at least one user, one or more machine learning techniques to at least a portion of the processed time series data;
to compute one or more qualifying values attributable to the at least one generated data forecast by providing the at least one generated data forecast and the at least a portion of the processed time series data to a conformal prediction framework; and
to perform one or more automated actions based at least in part on the at least one generated data forecast and the one or more computed qualifying values, wherein performing the one or more automated actions comprises outputting, in response to at least one user request for data forecast information submitted via at least one interactive graphical user interface, at least one visualization of at least a portion of the at least one generated data forecast and at least a portion of the one or more computed qualifying values via the at least one interactive graphical user interface.

16. The apparatus of claim 15, wherein the one or more machine learning techniques comprise at least one segmented regression technique integrated with a greedy algorithm.

17. The apparatus of claim 15, wherein the one or more qualifying values comprise at least one confidence value attributed to the at least one generated data forecast.

18. The apparatus of claim 15, wherein the one or more qualifying values comprise at least one credibility value indicating quality of the at least a portion of the processed time series data used in generating the at least one data forecast.

19. The apparatus of claim 15, wherein the at least one data forecast pertains to anomaly detection.

20. The apparatus of claim 15, wherein the at least one data forecast pertains to capacity utilization.

* * * * *